July 30, 1974  B. S. KIRK ET AL  3,826,742
GAS ABSORPTION SYSTEM AND METHOD
Filed Sept. 20, 1971  3 Sheets-Sheet 3
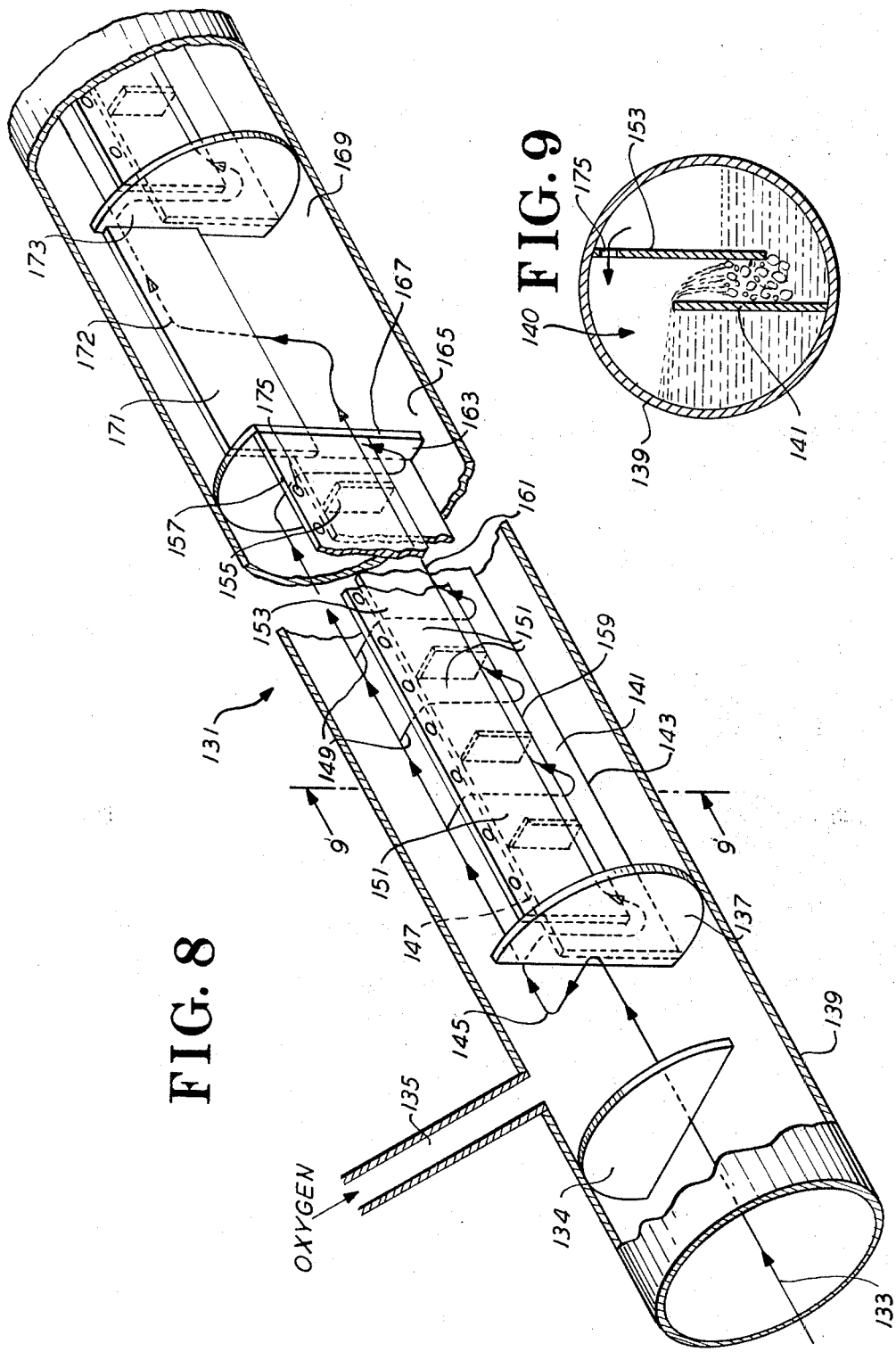
INVENTORS
BRADLEY S. KIRK
RAYMOND M. CHAPPEL
BY
F. B. Henry
ATTORNEY

United States Patent Office 3,826,742
Patented July 30, 1974

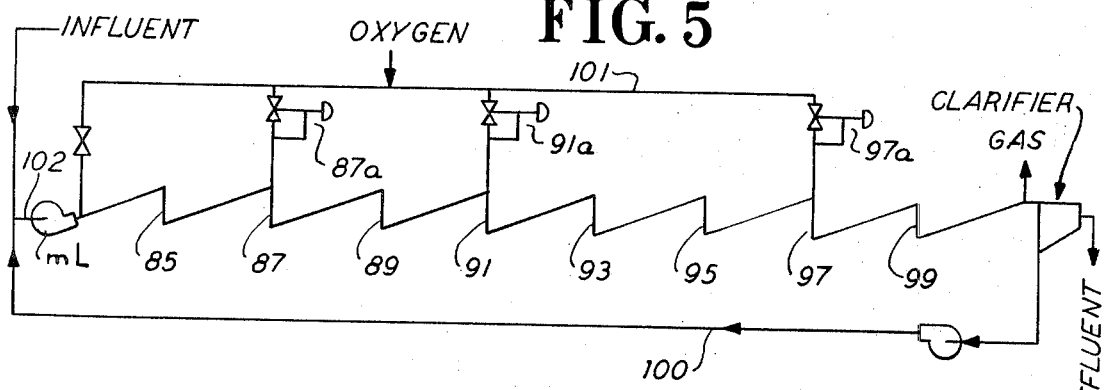
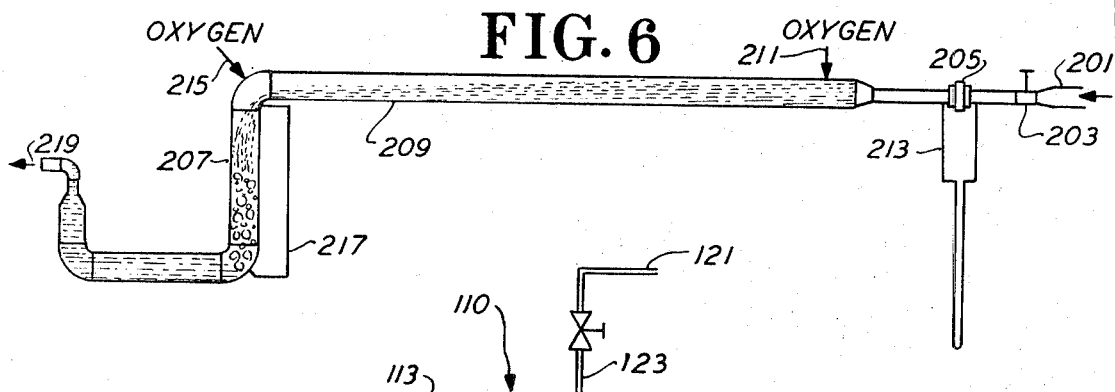
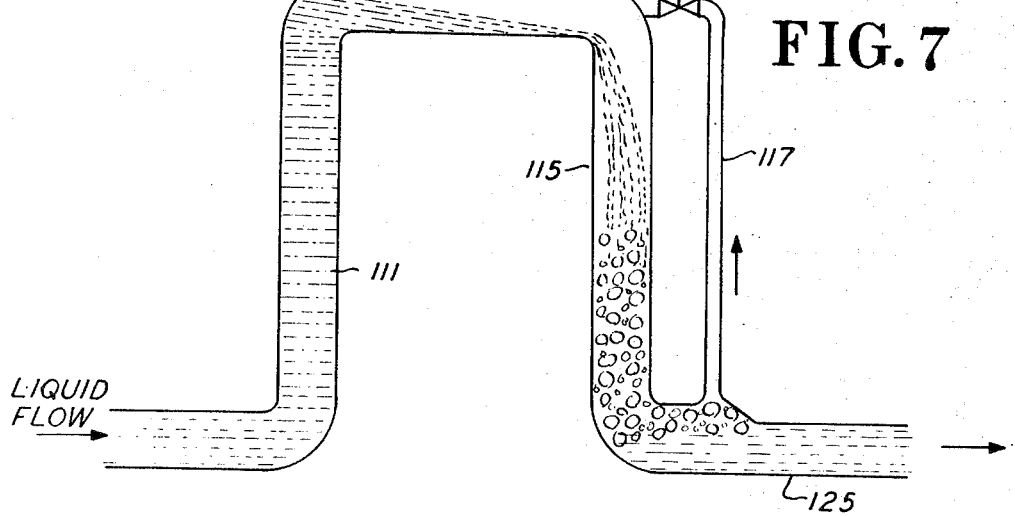
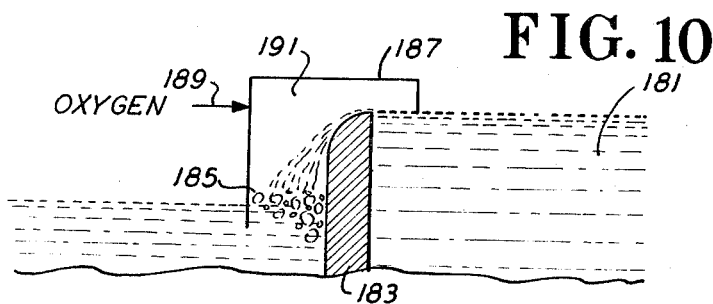

3,826,742
GAS ABSORPTION SYSTEM AND METHOD
Bradley S. Kirk, Warren Township, Plainfield County, and Raymond M. Chappel, Mendham, N.J., assignors to Airco, Inc., New York, N.Y.
Filed Sept. 20, 1971, Ser. No. 181,785
Int. Cl. C02b 3/08
U.S. Cl. 210—63                                    19 Claims

ABSTRACT OF THE DISCLOSURE

A gas absorption system for adding oxygen to a liquid phase flowing in the system. The liquid phase is subjected to fall through an enclosed gravitational fall zone, which zone is proportioned in relation to system flow as to permit simultaneous presence within the enclosure of the liquid phase and a gaseous oxygen phase. The oxygen is provided by injection means or the like, and means may additionally be present for matching the rate of oxygen feed to the rate of consumption at the fall zone.

BACKGROUND OF INVENTION

This invention relates generally to gas absorption technology and more specifically to apparatus and methods useful in water treatment where oxygen addition to a flowing liquid phase is required. The techniques outlined however can be applied to the dissolution of gas into liquid.

In numerous applications of water treatment technology, a central problem becomes that of obtaining sufficient dissolution of a gaseous material, notably oxygen, into the liquid phase undergoing treatment. In this connection, for example, it is instructive to consider such oxygen dissolution processes as they occur in a pipeline reactor for the secondary biological (activated sludge) treatment of waste water. A reactor of this type is disclosed in U.S. Pat. No. 3,607,735 which issued to Howard K. Hover et al., entitled "System for Treatment of Secondary Sewage," which patent is assigned to the assignee of the instant application. This patent discloses a unique method of contacting oxygen, waste water and activated sludge in an elongated pipeline reactor. This patent further teaches the utilization of various mixing devices in the reactor at spaced intervals to assist in the dissolution of the oxygen.

In general, the rate of oxygen dissolution can be increased by increasing turbulence in the liquid phase being treated. But in the case, for example, of the reactor cited above the increasing of liquid turbulence by increasing the liquid velocity in a uniform size pipe is constrained by the requirement that the mixed liquor remain in the pipeline for a period sufficient for complete reaction. Since the average velocity must therefore be so limited, it is economically perferable to enhance turbulence only in small segments of the reactor.

Aside from the problem of obtaining sufficient dissolution of oxygen in the water being treated, a further difficulty arises by virtue of the varying oxygen demand of the treated liquid particularly where waste water is being processed. In the case of the foregoing reactor, for example, economic requirements demand that little of the oxygen being fed to the reactor be wasted. On the other hand, the correct amount must be fed to the reactor to treat the water passing through it.

In accordance with the foregoing, it may be regarded as an object of the present invention to provide apparatus and methods whereby oxygen may be effectively and rapidly added to a liquid phase, such as to waste water flowing in a treatment system in response to the oxygen demand.

It is a further object of the present invention to provide apparatus and methods whereby the oxygen dissolution rate into a liquid phase being treated with said oxygen is made very large and which, more over, enables simple, inexpensive, rapid and reliable control for the rate of oxygen feed to the system in which the invention is employed.

It is an additional object of the invention to provide apparatus and methods for effective dissolution of oxygen into liquid phase, which has applicability to a wide range of water treatment operations including those involving activated sludge systems and naturally or artificially impounded bodies of water.

SUMMARY OF INVENTION

Now, in accordance with the present invention, the foregoing objects and others as will become apparent in the course of the ensuing specification are achieved in a system and method according to which the liquid phase to be oxygenated is subjected to fall through an enclosed gravitational fall zone, which zone is so proportioned in relation to flow as to permit simultaneous presence within the enclosure of the liquid phase and a gaseous oxygen phase. The oxygen is provided by injection means or the like, which may feed directly into the fall zone. In a typical system the said fall zone may be defined by a vertically oriented section forming part of a closed conduit or enclosure in which the liquid undergoing treatment flows. In an embodiment noteworthy for its efficiency of operation, a plurality of such vertically oriented sections are adjoined by a plurality of linearly sloping rise sections present in said conduit, the various adjoined sections defining a saw-tooth type profile for coursing by said liquid phase.

In order to provide gas injection to the fall zone in accordance with the rate of oxygen utilization thereat, means may be present for monitoring the pressure at the top and bottom of the fall zone and for metering the flow of oxygen so as to maintain a substantially constant pressure differential.

BRIEF DESCRIPTION OF DRAWINGS

The invention is diagrammatically illustrated, by way of example, in the drawings appended hereto in which:

FIGS. 4 and 5 are schematic illustrations of saw-tooth type arrangements wherein a plurality of elements similar to that of FIG. 1 are serially arranged in a continuous conduit.

FIG. 6 is a schematic illustration of a testing arrangement utilized to illustrate several performance characteristics of the invention.

FIG. 7 schematically depicts an embodiment of the invention including a return loop for feeding back to the fall zone excess oxygen which may escape from the zone.

FIG. 8 is an isometric, broken-away schematic view of an embodiment of the invention particularly suitable for modular, large-scale installations; and FIG. 9 is a cross-sectional view along the line 9'—9' therein.

FIG. 10 depicts in schematic fashion application of the invention to aeration of an impounded body of water.

DESCRIPTION OF PREFERRED EMBODIMENT

Figure 1:
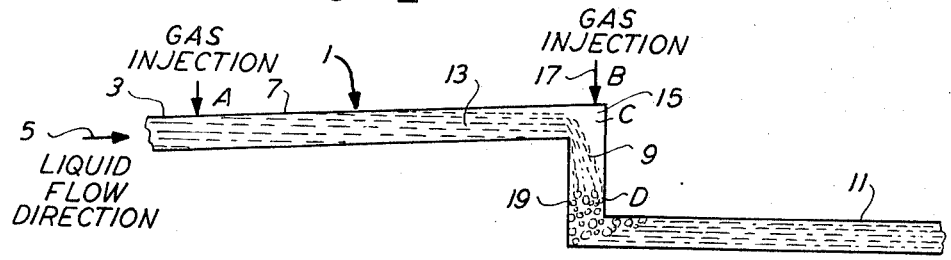
FIG. 1 is a schematic depiction of a basic embodiment of the present invention.

FIG. 1 depicts in schematic fashion a basic apparatus embodiment of the present invention. As seen therein an enclosed conduit, generally designated at 1, as for example a pipe or the like, carries a liquid flow entering the section of conduit depicted at the end 3 as suggested by the arrow 5. It will, of course, be clear that the conduit 1 depicted need not exist in isolation but may be part of a larger system; for example, conduit 1 may be part of a pipeline reactor in an activated sludge system such as that disclosed in the previously mentioned Hover et al. patent.

Conduit 1, while continuous, may be regarded as made up of three serially connected sections, via an upwardly sloping rise section 7, a vertically oriented fall section 9, and an exit section 11 of essentially horizontal orientation. The rate of flow of liquid 13 in rise section 7, which liquid may for example comprise waste water or mixed liquor in the case of an activated sludge process, is such that liquid 13 essentially fills the entire volume encompassed by section 7. Upon reaching the fall section 9, however, liquid 13 undergoes a precipitous drop, falling under the influence of gravity and a void 15 appears in the fall section. At the bottom of section 9 flow is seen to be reestablished out of section 11 as a mass of liquid again essentially completely filling all portions of section 11.

In accordance with the invention, fall section 9 may be regarded as a "fall zone" whereat high levels of oxygen absorption are achieved. If oxygen is added at some point such as A any distance upstream from the fall zone it will collect as a pocket in the void 15 as shown. This pocket will remain provided sufficient gas is injected at point A or enters with the liquid as entrained bubbles to equal the gas dissolved or entrained in the liquid leaving through exit section 11.

As shown, the liquid falls by gravity from level C to level D determined by the volume of gas in the pocket. The falling liquid generates a highly turbulent zone starting at level D which produces a high rate of oxygen transfer into the liquid phase. This zone consists of a froth in which gas bubbles are surrounded by liquid.

The gas leaving the fall zone either has been dissolved into the liquid or is carried away as bubbles entrained in the liquid. If sufficient undissolved gas enters the fall zone as gas bubbles entrained in the liquid from injection, as at point A or is added at point B into the gas pocket, the level D will remain constant provided no other changes are made in the system. Gas inflow equals gas outflow, hence the level will remain constant. Changes in liquid properties, flow rates or gas pressures which would change the rate of oxygen dissolution or entrainment would alter the level of the fall because of simple material balance considerations.

If insufficient gas is being supplied to equal the sum of the gas dissolved or carried away as entrainment, the froth level will rise. If an excess of gas is supplied, the level will fall. This simple result of the material balances obtained here presents a method of controlling the action of the fall.

It has been found that the amounts of oxygen dissolved and entrained are principally functions of the fall height and the superficial liquid flow velocity. Thus, by controlling the fall height, the amount of oxygen dissolved or entrained can be held constant. The fall height is easily controlled by sensing the froth height or its equivalent as still liquid level in the fall zone directly or by sensing of the static pressure head of the column and regulating the supply of gas at point A or B. A more detailed discussion of these techniques will be given in connection with the embodiment shown in FIG. 2.

Because of the schematic nature of the FIG. 1 showing, no attempt has been made to depict details of the gas injection means utilized at points A and B. These may, however, comprise any of various devices known to be useful for such purposes, including perforated pipes, gas nozzles and so forth.

Figure 2:
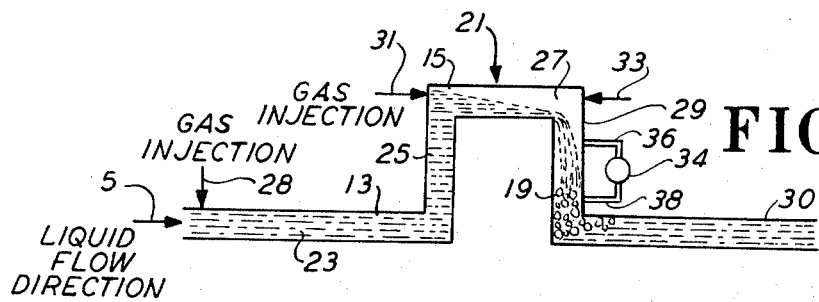
FIG. 2 is a schematic depiction of a second embodiment of the invention.

In FIG. 2 a further embodiment of the invention is schematically set forth. The continuous enclosed conduit 21 therein is now seen to consist of the serially connected sections 23, 25, 27, 29 and 30, forming an inverted U bend. The input section 23 is seen to be essentially horizontal, rise of the liquid 13 now taking place in the vertically oriented section 25. The liquid then traverses the short horizontal section 27. Because of flow conditions, i.e. velocity and volume of flow, it will be noted that a void 15 similar to the similarly identified void discussed in connection with FIG. 1 is present at section 27, and it is into such void 15 that oxygen gas may be injected as by the gas injection means suggested at 31, 33 with additional injection being provided upstream by means 28. As is the case in the FIG. 1 embodiment, the liquid 13 now precipitously falls through the fall zone defined at section 29 to form the same frothy, bubbly gas transferring mass 19 that has been described in connection with FIG. 1. The efficiently oxygenated liquid then emerges via the section 30.

In order to sense the height of the fall and thereby regulate the same, a sensing means 34 has been added to the inverted U bend. By knowing the fall height we can regulate the feed of injected gas in accordance with the requirements of the process of aeration proceeding in section 29. The sensing means 35 is adapted to provide an indication of the liquid level in the section 29. The sensing means 34 may take the form of a simple transparent tube having legs 36 and 38 connected respectively to the top and bottom of the fall zone. If gas is not continually injected into the system, gas will be absorbed and entrained from the pocket of gas at 15 and as this gas is exhausted the level of liquid will rise. This rise can be sensed, as for example by personal observation or by a photo-cell and light source combination arranged across the transparent tube. A control signal may thereby be generated and used to open a valve or other mechanism for the addition of more gas to the system to make up for the gas absorbed and entrained. In contrast if an excess of gas is added the level of the froth in section 29 will drop and the level sensor may be arranged to discontinue the flow of gas to the system. Thus the gas addition to the system can be matched to the gas absorption and entrainment in the system.

Figure 3:
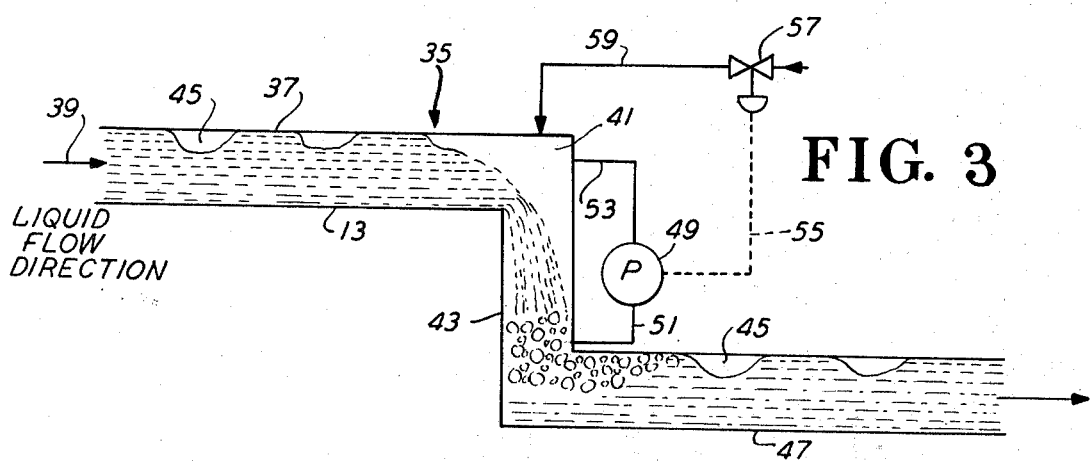
FIG. 3 depicts in schematic fashion a further embodiment of the invention and also illustrates the manner in which oxygen injection may be matched to consumption.
Figure 4:
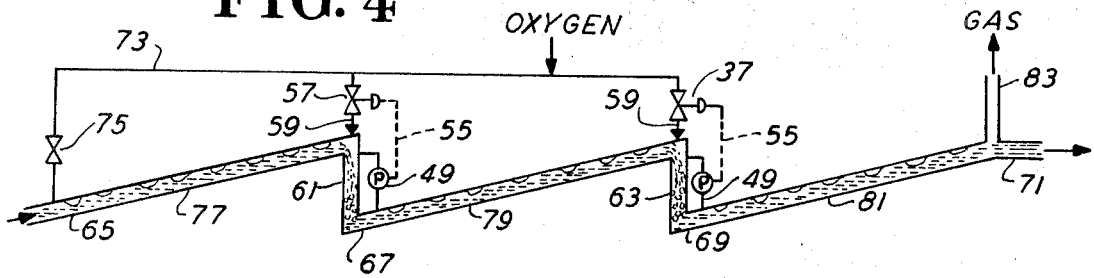

The schematic depiction of FIG. 3 sets forth in greater detail an arrangement for matching the gas feed to consumption at the fall zone. The enclosed conduit 35 therein, once again a pipe or the like, consists of an essentially horizontal input section 37 into which waste water or other liquid-based material to be oxygenated is passed as at 39. Once again flow conditions are such that a space 41 is created at the vertically oriented fall section 43 as the liquid 13 plunges downwardly through such section. It may in this connection be noted that the present figure also suggests as at 45 the existance of gas pockets 45 in the liquid approaching the fall, which may for example result from gas being injected upstream in the manner that has previously been described. The formation of such gas pockets depends on a number of factors, such as the rate of oxygen injection, the orientation of the pipe, the manner of oxygen injection, etc. In oxygen injection systems such as that shown, it is desirable to reduce to the extent possible the large bubble formation. Fine bubbles are preferred since they allow for greater oxygen absorption. It has been found that upwardly inclined pipes such as shown in FIG. 4 more readily tend to form the illustrated spaced and moving bubbles along the upper surface thereof. After passing through the oxygenation process at fall section 43 the oxygenated liquid passes out the horizontal section 47 with excess gas pockets being once again suggested as at 45.

FIG. 3 shows a differential pressure sensing means 49 which is seen to have sensing terminals 51 and 53 for comparing the pressure at the bottom and top of the fall zone. Sensing means 49 is arranged to provide via the control loop 55 a signal to gas metering valve means 57 which, in turn, provides control for gas entering the system via line 59. It will be clear that means 49 may be set to provide appropriate control signals upon departure of the differential pressure from some preselected level, whereby flow of oxygen into the system may be augmented or diminished in accordance with the rate of use thereof, whereby an automatic and simple control is provided for matching the rate of oxygen feed to the particular processes occurring in the system.

The total pressure sensed by terminal 51 is the sum of the pressure in the gas spece 41 plus the pressure equivalent of the gas bubble and liquid mixture above the terminal. Thus $$P_{51} = P_{41} + \rho_t gh$$

or $$P = (P_{51} - P_{41}) = \rho_t gh$$

where $\rho_t$ is the average density of the froth column, $h$ the froth height and $g$ the acceleration of gravity. A sensor, such as differential pressure cell 49 will sense P and hence the height $$h = \frac{P}{\rho_t g}$$

This differential pressure can be transduced, electrically or pneumatically, to a signal which can used to operate a solenoid valve such as 57 for gas addition at 59 or upstream. Thus when the level rises the valve is made to close and when the level falls the valve is opened.

FIGS. 1-3 are illustrative of three different piping arrangements for creating the fall zone. Other configurations will become obvious to those skilled in the art. For example a U shaped fall may be used (as opposed to the inverted U bend of FIG. 2). In addition, both horizontally arranged and slightly vertically inclined piping sections may be used to feed and remove the liquid from the fall zone. The fall zone is preferably vertically oriented; however, the system will also operate with a fall system which is somewhat inclined to a plumb line.

FIGS. 4 and 5 are schematic illustrations of saw-toothed profiled arrangements including in series a plurality of fall zone-bearing conduit sections similar to those described in FIGS. 1-3. Thus in FIG. 4 an arrangement is shown (which may, for example, be part of a pipeline reactor) which illustrates one method in which an overall system using multiple fall zones can be controlled. Liquid enters at point 65 and by manual (or automatic flow proportioned) control oxygen is injected from line 73 via valve 75 at a rate sufficient for the minimum anticipated over-all oxygen demand of the process up to point 71. The reacting liquid and gas travel along pipe 77 to the first fall 61, which is set via the control mechanism discussed in connection with FIG. 3 (similar parts being correspondingly identified) to automatically maintain a froth column height corresponding to the gas sweep-through rate for the minimum expected oxygen consumption between points 67 and 71. If the oxygen consumption in segment 77 is greater than the anticipated, minimum rate, less gaseous oxygen than anticipated will enter fall zone 61 and this will tend to cause the height of the froth column therein to rise. This tendency is sensed by means 49 which automatically opens valve 57 to introduce enough oxygen to maintain the set forth column height which, in turn, insures that a constant volume of oxygen gas is swept into the pipe 79 connecting point 67 to point 69.

The action at fall zone 63 is similar to what occurs at zone 61, except that the controlled froth column height is set so that the quantity of oxygen gas swept into pipe segment 81 corresponds to the greatest oxygen consumption anticipated in this last segment of the pipeline reactor. Under normal conditions, not all of this gas will be consumed and the excess may be vented (or recycled) via the outlet 83. However, even though the amount of gas vented at 83 may be an appreciable fraction of the gas added at fall 63, it is only a small fraction of the total amount of oxygen fed to the process at points 65, 67 and 69.

Even greater oxygen economy can be realized by a superproportional control of the gas addition at point 69.

If the oxygen demand of the waste water is higher than normal, the amount of oxygen entering point 69 will be less than normal and more oxygen must be injected at fall zone 63. This also implies that the oxygen uptake rate in the final segment 81 will be greater than normal. To accommodate this, the control mechanism, which may be positioned between the sensing means 49 and the valve 37, can be such that as the oxygen injection valve is opened to correct the deficit of oxygen entering from point 67, the set point for the froth column height is lowered so that more oxygen gas is swept into segment 81.

Long term variations in the oxygen demand of the process can be accommodated by adjusting initial oxygen feed and froth column set points on the basis of the amount of oxygen vented from the end of the reactor. This adjustment may be made manually or automatically using very slow negative feedback control. Moreover, slow negative feedback control may be connected between sequential fall zones. For example, if the controller calls for fast oxygen addition in fall zone 63, this can be fed back to lower the froth column height in fall zone 61 so that more oxygen is swept from point 67 toward point 69.

In FIG. 5, a much larger number of successive fall zones are serially arranged, in a construction otherwise resembling that of FIG. 4. The schematic illustration of FIG. 5 illustrates that one need not inject oxygen at every fall zone. Thus in FIG. 5 it is seen that oxygen is injected only at fall zones 87, 91 and 97 from the oxygen line 101, while fall zones 85, 89, 93, 95 and 99, which have no oxygen injection or froth height control, are employed only to increase the rate of oxygen absorption. FIG. 5 also shows the series of fall zones schematically in an activated sludge system. A line 100 returns the sludge from the clarifier where it is mixed with secondary effluent in line 102. The mixed liquor ML is then pumped through the system for treatment and the purified effluent is drawn from the clarifier.

FIG. 5 also shows an alternative approach to controlling the addition of oxygen to the system. This approach uses pressure regulators in the gas feed to the falls, such as at 87a, 91a, and 97a. These regulators sense the gas pressure at the fall zone and automatically add additional gas or close as necessary to maintain the desired set gas pressure. The pressure in each regulated zone will generally be equal to the sum of the pressure drops occurring in the downstream fall zones. Hydraulic friction losses are very small and therefore can be essentially discounted.

Consideration of FIGS. 4 and 5 will make evident that in employing the principal of the present invention, various alternative arrangements are possible. For example, the fall zones may be made up of U bends (both inverted and conventional) or any other configurations which create the "falls." Several variables influence the total amount of oxygen transferred to the liquid in the fall zone of the invention: (1) the height through which the liquid falls; (2) the superficial flow velocity (the volumetric liquid flow rate divided by the cross-sectional area of the vertical pipe) of the liquid; (3) the height of the froth column; (4) the partial pressure of oxygen in the gas; and (5) the properties of the liquid.

In designing systems such as shown in FIGS. 4 and 5 attention must be directed to the benefits to be gained by increasing the fall height as opposed to the energy requirements needed to lift the liquid to the greater fall heights. Experimentation and analysis has revealed that the best overall return is actually achieved by allowing the liquid to be oxygenated to fall through successive fall zones as opposed to a single fall through a zone of height equal to the sum of the several smaller ones. For example in tests run on 6 in. and 10 in. diameter pipes at varying flow velocities, the amount of oxygen dissolved per theoretical H.P.-hr. increased as the height of the fall decreased. These tests showed that one gets a better return on his energy investment as the height of the fall decreases. Other tests were run to determine the effect on the absolute amount of oxygen dissolved when related to fall height. This may be described as the oxygenation efficiency and is a measure of change in oxygen concentration upon passing through a fall zone as a percentage of the initial oxygen deficit. It was found that in general oxygenation efficiency increases with height. Thus when taking the test results together it is clear that one should suitably trade off a certain absolute amount of increased oxygenation in return for getting a good return on degree of oxygenation in terms of energy input supplied by elevating the water. As a practical matter, a superior overall arrangement is achieved in a device, e.g. of the configuration as shown in FIG. 5, when a series of relatively low fall zones are successively utilized as opposed to the use of a more limited number of zones having in totality the same overall fall height.

The aforementioned tests were conducted with apparatus as shown in FIG. 6. Water from a water main was metered into the system via conduit 201 and valve 203. The flow passed through an orifice meter 205 and flowed to the fall section 207 through approximately thirty feet of horizontal pipe 209. The fall sections 207 were 61 in. high for the 6 in. tests and 76 in. high for the 10 in. tests. Since the total height of the vertical leg was fixed, the height of the froth column was dependent upon the fall height and could not be independently varied. A U-tube manometer measured pressure at meter 205, and oxygen was injected upstream at 211 or at point 215 at the fall zone. A water level indicator tube at 217 provided visual indication of still liquid level in the fall zone. The water left the system at 219 and proceeded to a drain. As mentioned above, tests were conducted for the two sizes of pipe using varying superficial flow rates. It was found that as the superficial velocity increases additional turbulence can be expected to occur and to promote higher oxygen trnsfer rates. However, with increased velocity the residence time of the water is shortened and the amount of time for oxygen transfer is reduced. Thus, for any particular height of fall there is an optimum range of superficial velocities. It was found that a superficial velocity within the range of from about ½ ft./sec. to about 2 ft./sec. provided good results; however, a range of from about ¾ ft./sec. to about 1½ ft./sec. was found to be preferred. These ranges resulted in maximum energy efficiency and high transfer rates.

As had previously been discussed in connection with FIG. 3, a goodly part of the oxygen fed into the fall zones of the apparatus of the present invention actually departs from the zone as entrained bubbles which enter the downstream side of the system from which the gas may be inefficiently exhausted from the system. As oxygenation in accordance with the invention largely occurs at the froth column present at the bottom of the fall zone, the object sought to be achieved is retention of the gas at such zone. In FIG. 7 an arrangement is shown which is most effective in achieving such a result. The arrangement therein shown is seen to be generally similar to the embodiment discussed in connection with FIG. 2; the closed conduit 110 thus including a rise section 111, a horizontal section 113 and a fall section 115. Oxygen is injected via the tube 123 from a line 121. It will be seen that the output section 125 connected to the bottom of the fall zone now has connected to it a small feedback pipe 117. Entrained excess gas bubbles departing from the fall zone tend by virtue of their lower comparative density to collect at the upper portions of the section 125 where they enter pipe 117 and under the control of a valve are fed back to the fall section. The driving force for this gas recycle is simply the hydrostatic head of the froth column minus frictional losses in the pipe. The net overall process is thus one in which oxygen is utilized with the greatest efficiency. The gas recycle concept can be used in the various embodiments of the invention as described herein.

An important factor in integrating the fall concept into an oxygenation system is the sweep-through of gas as bubbles entrained in the liquid leaving the fall. In some cases no entrainment is desired; in others it may be. For instance, in the oxygenation of fresh water which is usually saturated with nitrogen, nitrogen can be desorbed in the fall. If no gas is removed by entrainment in the water leaving the fall, nitrogen will build up in the gas space of the fall. This decreases the efficiency of the fall since the oxygen transfer rates are dependent upon the concentration of oxygen in the fall gas space. Thus some entrainment is desirable.

On the other hand, where no gas is desorbed, entrained oxygen is lost from the fall. Oxygen must be added to make up for the loss of either recycle or addition from fresh supplies in order to maintain a constant fall height. As discussed in previous paragraphs, automatic recycle can be provided simply by a disentrainment space below the fall and a recycle line back to the fall gas space. This recycle capability is desirable especially when the fall height is large and the height of the column below is small since such characteristics result in a sizeable sweep-through of gas.

In FIG. 8 a tubular device 131 appears which is a version of the invention ideally adapted to large scale waste water treatment systems. The isometric cut-away schematic depiction is of a length of the device which may be repeated indefinitely, that is to say the section shown may be regarded as a modular type unit which as desired may be placed in series or in parallel with similar units. Waste water or similar liquid-based system undergoing treatment is seen to enter device 131 from direction 133 as from a mixed liquor pump. The device 131 may be suitably placed in an activated sludge pipeline reactor as discussed above, or in a sewer or storm main or in any other location for treatment of waste water, mixed liquor, etc. Oxygen is fed into the system via a suitable oxygen injection means such as pipe 135. A vapor lock 134 is located upstream of the injection means to prevent the loss of oxygen in an upstream direction. A dividing baffle plate 137 extends partially across the part of pipe 139 nearest to view and joins a longitudinal dividing plate or weir 141 the bottom 143 of which is joined to the bottom of pipe 139. In view of such construction, the liquid follows the path 145 and passes into the space behind weir 141. The top 147 of weir 141 does not extend vertically to the full inside height of pipe 139 and hence the liquid behind plate 141 spills over the lip 147 of the plate and undergoes fall along the paths indicated by arrows 149 and into the fall zones 151 present between weir 141 and a second longitudinal plate 153 spaced from weir 141 by the transverse plates 155. Plate 153 extends upwardly so that its upward edge 157 adjoins the upper wall of pipe 139; in consequence the liquid proceeding along paths 149 passes under the lower edge 159 of plate 153 and thence proceeds along the longitudinal path 161 lengthwise in pipe 139 by-passing the plate 163 through the space 165 between the edge 167 of this plate and the inside pipe 139 wall. The liquid thence enters a gas separation zone 169 containing a baffle plate 171 which extends downwardly from the pipe wall to form a vapor lock with the liquid at zone 169. Such gas bubbles as may still be entrained pass under baffle plate 171 to the back side thereof where such gas is then table to proceed via the path 172 into a conventional pipe or into a following modular section which begins at the dividing baffle plate 173. If desired the present device 131 may incorporate provisions for recirculating gas. This result is obtained by including perforations at the upper portions of plate 153 so that gas bubbles escaping from the fall zones may be recycled thereto. Such an arrangement is best seen in FIG. 9 representing a cross-sectional view along the line 9'—9' of FIG. 8, where the said perforations appear as holes 175 in the wall of plate 153.

In order for the device illustrated in FIG. 8 to work efficiently it is necessary to regulate the amount of oxygen injected through injecting means 135. If no oxygen is injected and the incoming flow 133 is sufficient to fill the inlet conduit, then the entire device will flood and no benefits will be gained. By injecting oxygen as above described, a vapor space will be created in the area 140, the size of this vapor space and the size of the fall for a given size of conduit, will be principally dependent on the amount of oxygen injected through 135 and the water flow rate. As discussed above, gases such as nitrogen and oxygen may also disentrain in the area of the fall zone. The highly oxygen charged atmosphere in the area of the fall zone will result in high oxygen absorption by the flowing water. Thus the flow rate, size of pipe and oxygen flow rate must be selected so as to result in a fall height which will give the desired oxygen uptake or treatment results.

The fall zone is more clearly shown in FIG. 9, wherein it can be seen that the falling liquid forms a highly turbulent zone in the oxygen-charged atmosphere of the fall.

Attention is directed to the elongated nature of the fall zone in FIG. 8. This length is considerably greater than the inlet pipe diameter. By creating a fall zone which extends for a considerable portion of the length of the conduit, a vastly increased oxygen uptake may be achieved. A much greater gas-liquid contact area is obtained using this concept. By placing such fall zones in series, an unusually efficient oxygenation system results.

In FIG. 10, a schematic depiction appears setting forth the manner in which the present invention may be applied to artificially or naturally impounded bodies of water. As seen therein, a body of water 181, as for example a stream, river, lake or the like is maintained at a first higher level by a dam 183 or equivalent device. The body of water is allowed to flow over the dam 183 to reach a lower level 185 within the enclosed fall zone 191 defined within the enclosure 187. Oxygen is injected within the fall zone 191 by convenient oxygen injection means 189.

Thus a stream, river, lake, reservoir, etc. which has an unacceptable dissolved oxygen level, or which has a high BOD level, can be treated by using the fall zone concept. The enclosure 187 can be constructed to extend below the water levels at the top and the bottom of the fall. This will serve to prevent undesired escape of the oxygen present in the enclosure. The enclosure may extend for the full width of the dam or impoundment or for only a part thereof. Suitable vapor locks should also prevent the escape of oxygen from the ends of the enclosure. Thus it can be seen that this invention provides an inexpensive and efficient technique for raising the oxygen level of streams of water passing over existing dams. If desired a gas recycle stream as discussed above may be used to return undissolved oxygen to the fall zone of the dam.

While this discussion has referred to the injection of oxygen into the flowing streams and/or fall zones, it is not intended that this reference be construed as limiting our teaching to the use of pure oxygen. In most cases the use of "commercially" pure oxygen will be preferred; however, it is also possible to use oxygen enriched air or other oxygen containing gas including ozone-oxygen mixtures to accomplish our results.

It is envisioned that the inventive processes and apparatus set forth herein may also be applied to the dissolution of other gases in liquid stream other than waste or other streams which have an oxygen deficiency or otherwise require treatment with oxygen.

While the present invention has been particularly described in terms of specific embodiments thereof, it will be understood in view of the instant disclosure that numerous variations upon the invention are now enabled to those skilled in the art, which variations in propriety are yet within the true scope of the instant teaching. Accordingly the present invention is to be broadly construed and limited only by the scope and the spirit of the claims now appended hereto.

We claim:

1. A free fall device for dissolving oxygen in a liquid comprising an enclosure means including gravitational fall zone means for generating and maintaining by the free fall of said liquid therein a highly turbulent froth column of bubbles extending upwardly in said fall zone means, inlet means in said enclosure for admitting a stream of liquid into said enclosure and subjecting said liquid to said fall zone means at a determinable flow rate, and means for injecting oxygen at a controlled rate to establish an oxygen enriched gas space within said enclosure in contact with said falling liquid and said froth column, to thereby satisfy the oxygen demand of said liquid by dissolving oxygen therein at a controlled rate with said liquid flow rate being substantially independent of said controlled rate of oxygen injection, means for sensing the rate of oxygen consumption in said fall zone means as indicated by the height of the gravitational fall in said fall zone means, and means for regulating the height of said gravitational fall by regulating the supply of oxygen in accordance with said rate of consumption.

2. A device according to claim 1 wherein the enclosure means includes a vertically oriented conduit defining the fall zone.

3. A device according to claim 2 wherein the conduit forms one leg of a U-shaped conduit.

4. A device according to claim 2 wherein the conduit forms one leg of an inverted U-shaped conduit.

5. A device according to claim 1 further including means to introduce oxygen into said enclosure to maintain the height of fall at a desired amount.

6. A device according to claim 1 further including means to introduce oxygen into the enclosure in response to the oxygen demand of the stream passing through the enclosure.

7. A device according to claim 6 further including means for sensing the differential pressure across the fall zone and regulating the introduction of oxygen in response thereto.

8. A device according to claim 1 further including means to entrap at least part of the oxygen entrained in the liquid downstream of the fall zone and return the same to the fall zone.

9. A method of increasing the oxygen content of a flowing liquid stream comprising:
   providing an enclosed gravitational fall zone, linking first and second liquid levels in the flow path of said stream;
   injecting oxygen at a controlled rate to provide and maintain an oxygen-enriched gas space within said enclosed fall zone;
   subjecting said stream within said enclosure to a flow rate substantially independent of the rate at which said oxygen is injected and to an unconfined free fall through said gas space and fall zone; and
   said fall zone being of sufficient height to generate and maintain by said free fall of said stream, a highly turbulent froth column of bubbles extending upwardly in said fall zone whereby a high rate of oxygen transfer into the liquid stream passing through said fall zone is enabled.

10. A method according to claim 9 further including regulating the height of gravitational fall of said liquid stream in said zone by regulating the supply of oxygen to said zone.

11. A method according to claim 10 further including sensing the rate of oxygen consumption in said zone as indicated by the height of the fall and regulating the supply of oxygen in accordance with the rate of consumption.

12. A method according to claim 11 further including sensing the height of fall by monitoring the pressure at the top and bottom of the fall zone.

13. A method according to claim 9 wherein the flowing liquid stream is a mixed liquor stream in an activated sludge waste treatment process.

14. A method according to claim 9 including flowing said liquid stream through said fall zone at a superficial velocity within the range of from about ½ ft./sec. to about 2 ft./sec.

15. A method according to claim 5 wherein the said superficial velocity is within the range of from about ¾ ft./sec. to 1½ ft./sec.

16. A method according to claim 9 further including entrapping oxygen gas disentrained from the liquid stream at a point downstream from the fall zone and returning the entrapped gas to the fall zone.

17. A method of increasing the gas content of a flowing liquid stream comprising:
  providing an enclosed gravitational fall zone, linking first and second liquid levels in the flow path of said stream;
  injecting an enriched atmosphere of said gas at a controlled rate to provide and maintain a gas space within said enclosed fall zone enriched with respect to said gas;
  subjecting said stream within said enclosure to unconfined free fall through said gas space and fall zone at a superficial flow velocity within the range of 0.5 to 2.0 ft./sec. from said first to said second liquid level;
  said fall zone being of sufficient height to generate and maintain by said free fall of said stream, a highly turbulent froth zone of bubbles extending upwardly in said zone from said second liquid level, whereby a high rate of transfer of said gas into said liquid stream passing through said fall zone is enabled.

18. A method according to claim 17 further including sensing the gas pressure in said fall zone and regulating the addition of gas to said zone so as to maintain a desired pressure in said zone.

19. A method of increasing the oxygen content of a flowing liquid stream comprising:
  providing an enclosed gravitational fall zone, linking first and second liquid levels in the flow path of said stream;
  injecting oxygen at a controlled rate to provide and maintain an oxygen enriched gas space within said enclosed fall zone;
  subjecting said stream within said enclosure to unconfined free fall through said gas space and fall zone from said first to said second liquid level, with the fall zone being of sufficient height to generate and maintain by said free fall of said stream, a highly turbulent froth column of bubbles extending upwardly in said fall zone from said second liquid level, whereby a high rate of oxygen transfer into the liquid stream passing through said fall zone is enabled; and
  regulating the height of said fall zone in accordance with the rate at which oxygen is transferred to the liquid in said fall zone.

References Cited

UNITED STATES PATENTS

| | | | |
|---|---|---|---|
| 2,762,202 | 9/1956 | Ponsar | 61—18 |
| 3,494,462 | 2/1970 | Baud | 210—528 X |
| 3,374,772 | 3/1968 | Gilst et al. | 119—71 |
| 3,335,082 | 8/1967 | Ullrich | 210—15 |
| 543,411 | 7/1895 | Taylor | 261—Dig. 75 |
| 2,812,167 | 11/1967 | Wroth | 261—119 X |
| 1,362,611 | 12/1920 | Ellms | 210—49 |

FOREIGN PATENTS

| | | | |
|---|---|---|---|
| 1,928,681 | 12/1970 | Germany. | |
| 2,043,071 | 12/1971 | France. | |
| 24,386 | 1914 | Great Britain | 210—15 |
| 96,928 | 5/1924 | Austria | 261—Dig. 75 |

OTHER REFERENCES

Whitsett, A. M., et al., Air in Transmission Mains, Jour. AWWA, November 1969, pp. 592–598 (P.O.S.L.).

Speece, R. E., et al., Downfall Bubble Contact Aeration, Proc. 25th Ind. Waste Conf., Purdue Univ., May 5–7, 1970, pp. 8–16.

JOHN ADEE, Primary Examiner

R. H. SPITZER, Assistant Examiner

U.S. Cl. X.R.

210—150, 220; 261—119, Dig. 75